(12) United States Patent
Koseki

(10) Patent No.: US 7,730,503 B2
(45) Date of Patent: Jun. 1, 2010

(54) DIVIDING DEVICE IN DISC ACCOMMODATION SECTION IN DISC CHANGER

(75) Inventor: Tomohisa Koseki, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 1165 days.

(21) Appl. No.: 11/339,722

(22) Filed: Jan. 24, 2006

(65) Prior Publication Data

US 2006/0168604 A1     Jul. 27, 2006

(30) Foreign Application Priority Data

Jan. 24, 2005    (JP) .............................. 2005-015788
Dec. 28, 2005    (JP) .............................. 2005-379509

(51) Int. Cl.
*G11B 17/22* (2006.01)
(52) U.S. Cl. .................................. 720/619; 369/30.82
(58) Field of Classification Search ............. 369/30.78, 369/30.81, 30.85, 30.87, 30.77, 30.82
See application file for complete search history.

(56) References Cited

U.S. PATENT DOCUMENTS

| | | | |
|---|---|---|---|
| 5,335,218 A | | 8/1994 | Osada |
| 5,848,034 A | | 12/1998 | Morioka et al. |
| 5,872,748 A | | 2/1999 | Shindo et al. |
| 6,301,205 B1 | * | 10/2001 | Nakamichi ............... 369/36.01 |
| 6,507,542 B1 | * | 1/2003 | Hopf et al. ............... 369/30.85 |
| 6,817,022 B1 | | 11/2004 | Taniguchi et al. |
| 6,996,835 B1 | | 2/2006 | Taniguchi et al. |
| 7,243,357 B1 | | 7/2007 | Taniguchi et al. |
| 2006/0168603 A1 | | 7/2006 | Goto |

FOREIGN PATENT DOCUMENTS

JP      5-020765      1/1993
JP      08-306114     11/1996

(Continued)

OTHER PUBLICATIONS

U.S. Office action dated Feb. 23, 2009, for related U.S. Appl. No. 11/339,834, noting listed U.S. references in this IDS.

(Continued)

*Primary Examiner*—Craig A. Renner
*Assistant Examiner*—Tamara Ashford
(74) *Attorney, Agent, or Firm*—Christie, Parker & Hale, LLP.

(57) ABSTRACT

A dividing device in a disc accommodation section of a disc changer decreases the stroke of dividing the disc accommodation section, thereby making the disc changer small. The dividing device is configured by having three levers fitted to a rotation axis. A first lever can rotate by 45 degrees and 90 degrees only by a rotation mechanism. The first lever capable of holding a movable rack is fitted to this rotation axis. A second lever and a third lever are fitted to the rotation axis adjacently to the first lever, and slidably on the rotation axis. The second lever holds a movable rack that accommodates a disc of which content is to be reproduced. The third lever holds other movable racks. Based on this mechanism, the disc accommodation section is divided into three parts at the time of reproducing the content of a disc.

17 Claims, 12 Drawing Sheets

FOREIGN PATENT DOCUMENTS

| | | |
|---|---|---|
| JP | 8-321122 | 12/1996 |
| JP | 9-073702 | 3/1997 |
| JP | 10-069697 | 3/1998 |
| JP | 10-112155 | 4/1998 |
| JP | 2000-163845 | 6/2000 |
| JP | 2001-351302 | 12/2001 |

OTHER PUBLICATIONS

Patent Abstracts of Japan, Publication No. 05-020765; dated Jan. 29, 1993, in the name of Hiroyuki Chigasaki.

Patent Abstracts of Japan, Publication No. 08-321122; dated Dec. 3, 1996, in the name of Kazuyoshi Hawiwara.

Patent Abstracts of Japan Publication No. 09-073702; dated Mar. 18, 1997, in the name of Kazuyoshi Hagiwara.

Patent Abstracts of Japan Publication No. 10-069697; dated Mar. 10, 1998, in the name of Shingo Kage et al.

Patent Abstracts of Japan, Publication No. 2001-351302, dated Dec. 21, 2001, in the name of Takayuki Ishibashi.

Patent Abstracts of Japan for Publication No. 08-306114; Date of publication of application Nov. 22, 1996; in the name of Nobuyuki Kubokawa.

Patent Abstracts of Japan for Publication No. 10-112155; Date of publication of application Apr. 28, 1998, in the name of Yuji Yamaguchi et al.

Patent Abstracts of Japan for Publication No. 2000-163845; Date of publication of application Jun. 16, 2000, in the name of Minoru Oikawa et al.

* cited by examiner

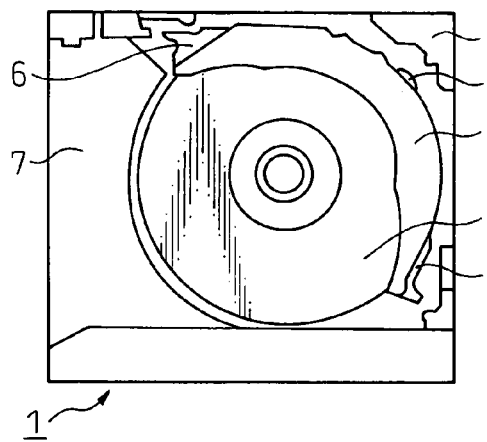
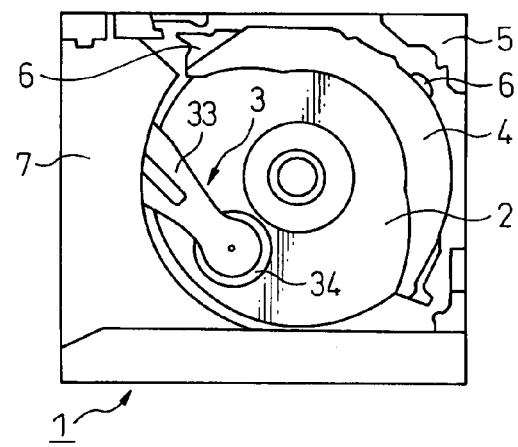
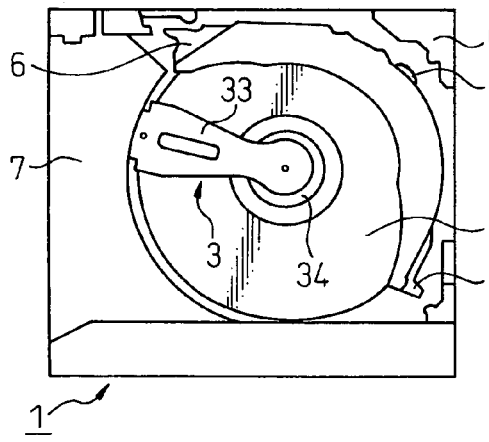
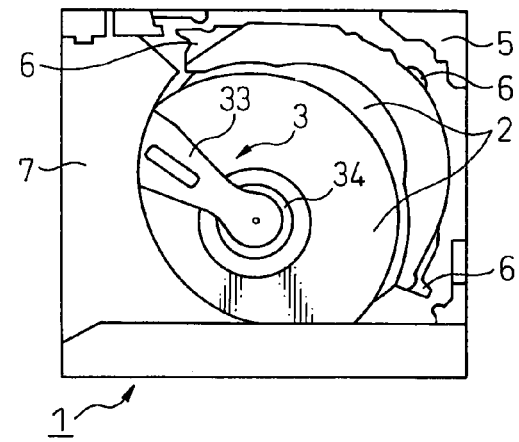
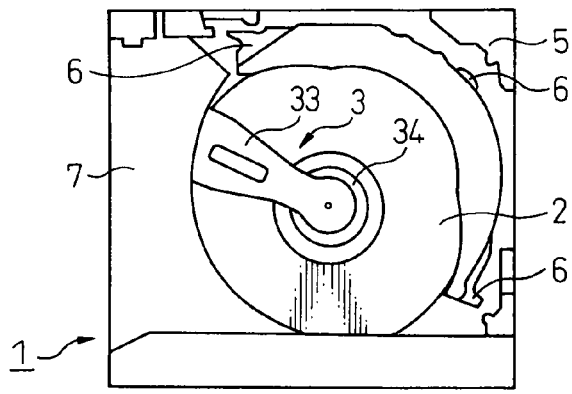

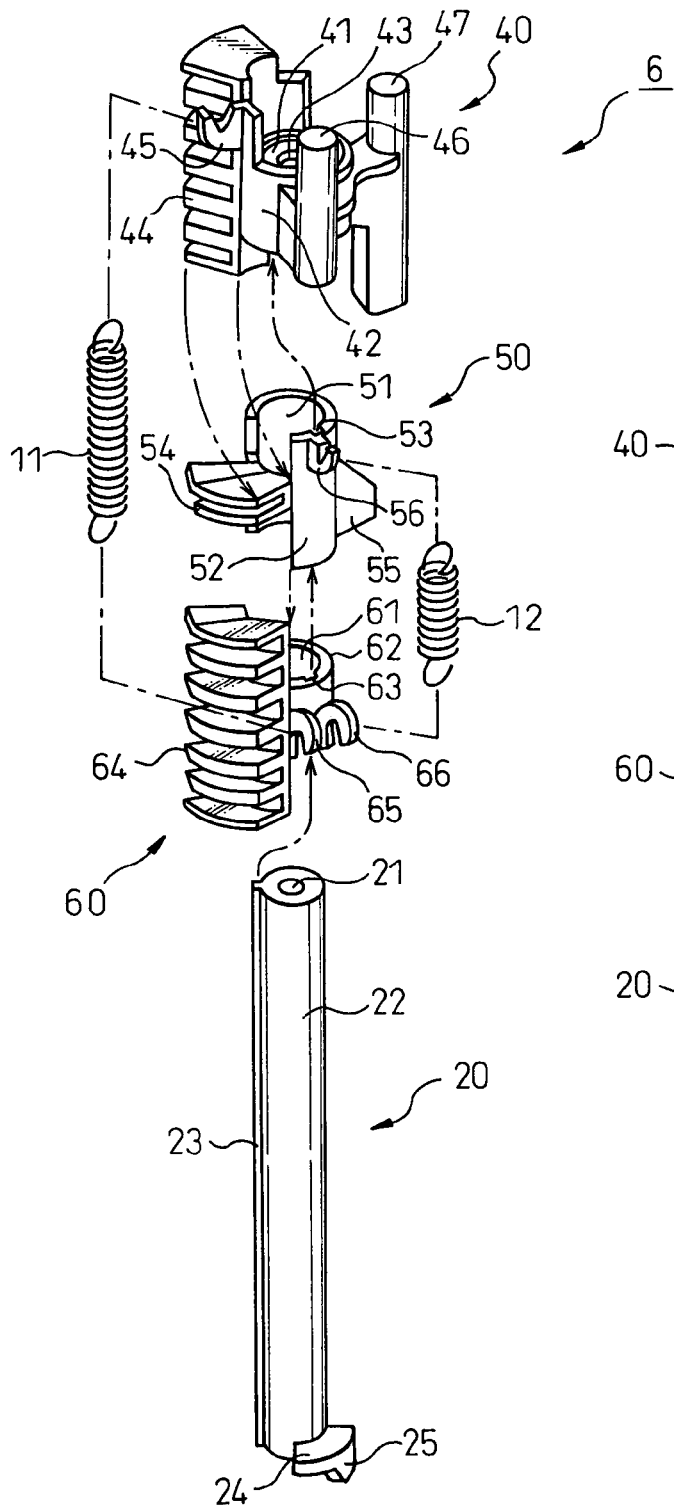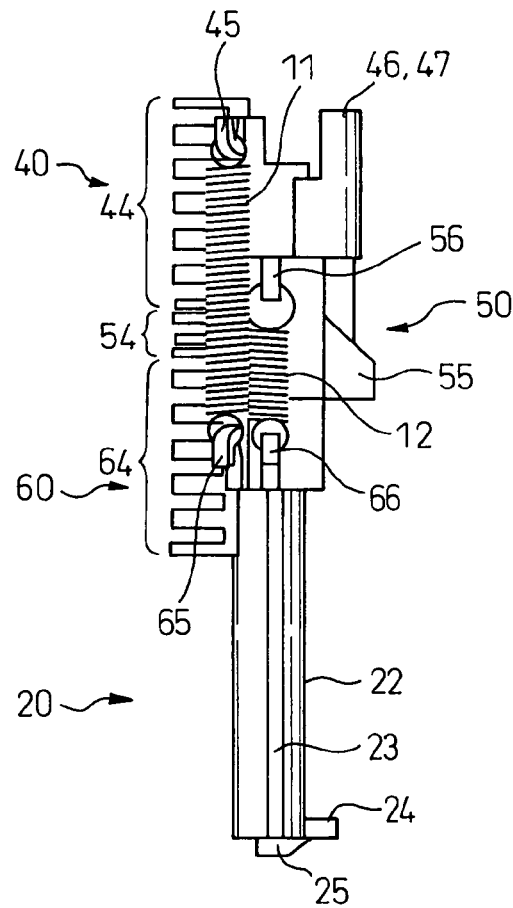
FIG.4A
FIG.4B

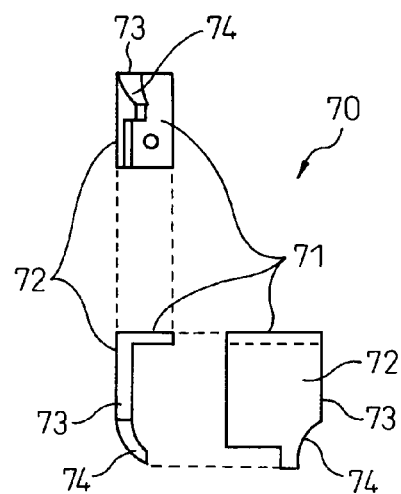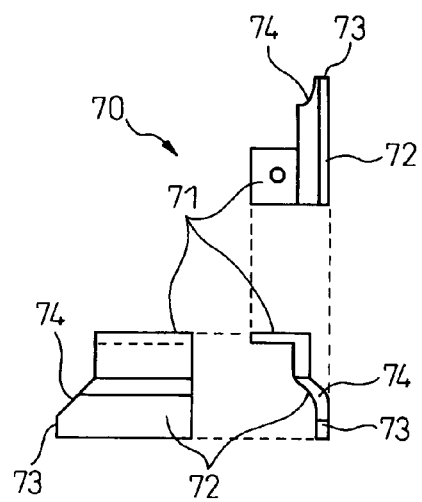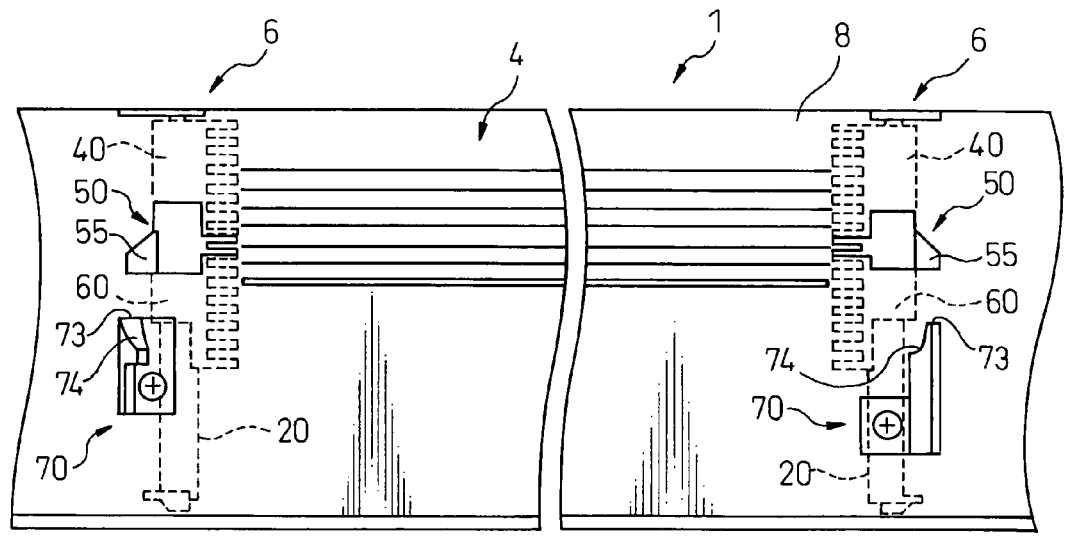

DIVIDING DEVICE IN DISC ACCOMMODATION SECTION IN DISC CHANGER

CROSS-REFERENCE TO RELATED APPLICATION

This application claims priority from, and incorporates by reference the entire disclosure of, Japanese Patent Applications No. 2005-015788, filed on Jan. 24, 2005 and No. 2005-379509 filed on Dec. 28, 2005.

BACKGROUND OF THE INVENTION

1. Field of the Invention

The present invention relates to a dividing section in a disc accommodation section in a disc changer. Particularly, the invention relates to a dividing device in a disc accommodation section in a disc changer that divides the accommodation section in the up and down directions in order to reproduce the content of a disc accommodated in the accommodation section and to exchange the disc, in the disc changer that has plural discs accommodated in the accommodation section and can exchange a content-reproduction disc.

2. Description of the Related Art

Conventionally, a cassette tape has been the mainstream medium recorded with music to provide music in a motor vehicle. However, a disc medium (hereinafter simply referred to as a disc) such as a compact disc (CD) and a mini disc (MD) is now mainly used in place of the cassette tape. Because the disc medium is thinner than the cassette tape, and particularly because an optical disc is not in a case, a disc changer that accommodates plural discs in a reproducing unit and reproduces the recorded content by changing the discs is popular. A disc changer is also being developed for a digital versatile disc (DVD) type of optical disc.

This disc changer of optical discs has a disc accommodation section capable of separately accommodating plural discs, one by one, inside a casing. A swing arm takes out a desired one of the discs from this disc accommodation section, and reproduces the content of the disc using an optical head. When the reproduction ends, the swing arm returns the disc to the disc accommodation section. In general, a turntable on which a disc is rotated and a clamper that fixes the disc onto the turntable are provided at the front end of the swing arm. An optical head moves in a radial direction of the optical disk, on a moving path formed on the swing arm, on the disc that rotates on the turntable, thereby reproducing the information recorded on the disc. Generally, the disc changer has the disc accommodation section movably arranged, in the up and down directions, to facilitate the taking out of a desired one disc from the disc accommodation section.

In order to draw out one disc and reproduce the content of this disc using the swing arm, the disc changer of the CD needs to have space above and below the disc to be drawn out from the accommodation section to allow the swing arm to enter the space at the time of drawing the disc. For this purpose, according to the conventional disc changer, discs located below the content-reproduced disc are moved, or the accommodation section is divided into several parts.

An early CD disc changer was large in size, and was accommodated in a trunk of a motor vehicle. However, due to an increasingly compact size of the disc changer in recent years, the disc drive unit that incorporates the disc changer can be accommodated in a center console of an instrument panel of the motor vehicle.

However, as a result of the small disc changer in the disc drive unit, there is little margin in the parts within the disc changer. Consequently, the operation of a dividing mechanism in the disc accommodation section becomes unstable at the time of drawing out a disc, of which content is to be reproduced, to the swing arm. Further, according to the conventional disc changer, after the disc accommodation section is divided into the upper and lower directions with a cam, a height of the stoppage of the accommodation section is selected, and a disc extraction device enters the space between laminated parts of the accommodation section. Therefore, the operation stroke at the time of dividing the accommodation section is long, and a total size of the disc drive unit becomes large.

SUMMARY OF THE INVENTION

It is an object of the present invention to provide a dividing device in a disc accommodation section in a disc changer that solves the conventional problems of a dividing mechanism in the disc accommodation section in the disc changer, decreases the size of the disc changer, and can divide a content-reproduced disc from other discs in a simple structure at the time of taking out the disc from the disc accommodation section.

In order to achieve the above object, according to a first aspect of the invention, there is provided a dividing device in a disc accommodation section in a disc changer, the disc changer including the disc accommodation section, having plural movable racks, each being able to hold one disc, mounted on a base plate, a lifting mechanism of the base plate, and a reproducing device that reproduces content of a desired one disc by taking the disc from the disc accommodation section, wherein the dividing device divides the disc accommodation section in the upper and lower directions at the time of taking out the disc, and comprises: a rotation axis that is axially supported at least at two positions close to the disc accommodation section, and can be rotated by a predetermined angle by a rotation mechanism; a first lever that is fitted to an upper part of the rotation axis, and can latch the movable rack based on the rotation of the rotation axis by a first angle; a second lever that is fitted to the rotation axis adjacently to the first lever, movably in an axial direction, and latches the one movable rack based on the rotation of the rotation axis by the first angle; a third lever that is movably fitted to the rotation axis adjacently to the second lever, in an axial direction, and latches the movable rack based on the rotation of the rotation axis by the first angle; an engagement member that is fixed to a casing of the disc changer near the rotation axis, and is engaged with the second lever when the base plate moves down to a predetermined or lower height in a state that the rotation axis rotates by a second angle larger than the first angle, thereby supporting the second lever; and a dividing member having a slope for lifting up and moving down the second lever by a predetermined height, when the rotation axis rotates in this state between the second angle and the first angle.

According to a second aspect of the invention, there is provided the dividing device in a disc accommodation section in a disc changer according to the first aspect, wherein the rotation axis and the first to the third levers can be connected together by a key and a key groove.

According to a third aspect of the invention, there is provided the dividing device in a disc accommodation section in a disc changer according to the second aspect, wherein a cam is provided at a lower end of the rotation axis, so that the rotation axis is moved in the upper direction when the cam rotates by the second angle.

According to a fourth aspect of the invention, there is provided the dividing device in a disc accommodation section in a disc changer according to the first aspect, wherein a first tension spring is applied to between the first lever and the third lever, and a second tension lever is applied between the second lever and the third lever. In a state that no external force is applied, the first lever can be closely contacted to the third lever.

According to a fifth aspect of the invention, there is provided the dividing device in a disc accommodation section in a disc changer according to the first aspect, wherein a claw-shaped latch section is provided in the first lever and the third lever respectively, a latch projection is provided at a part of each movable rack facing the rotation axis, and a front end of the latch section is tapered to facilitate the insertion of the front of the latch section into between the latch projections or into a space between the latch projection and the base plate when the rotation axis rotates by the first angle.

According to a sixth aspect of the invention, there is provided the dividing device in a disc accommodation section in a disc changer according to the fifth aspect, wherein a holding lever that prevents the plural movable racks from being separated when the latch sections of the first to the third levers are not engaged with the latch projections, is provided on the base plate.

According to a seventh aspect of the invention, there is provided the dividing device in a disc accommodation section in a disc changer according to the fifth aspect, wherein the dividing device is provided at least at two positions near the external periphery in the disc accommodation section, and the dividing devices are operated simultaneously by the rotation mechanism. According to an eighth aspect of the invention, two rods are provided at separated positions on a concentric circle in the first lever relative to the rotation axis, and the first lever is rotated when one of the rods is rotated by the rotation mechanism.

According to a ninth aspect of the invention, there is provided the dividing device in a disc accommodation section in a disc changer according to the eighth aspect, wherein the dividing device includes a first to a third dividing devices that are provided at three positions near both ends and near the center in the disc accommodation section respectively. The rotation mechanism includes: a motor; a first operation plate of which front end is engaged with one of the rods of the first dividing device, and which slides based on the rotation of the motor, thereby rotating the first dividing member; a second operation plate of which front end is engaged with one of the rods of the second dividing device, and which slides based on the rotation of the motor, thereby rotating the second dividing member; and a third operation plate which is engaged with any one of the rods of the first and the second dividing devices and with any one of the rods of the third dividing device, and operates the third dividing device synchronously with the operation of other dividing devices.

According to a tenth aspect of the invention, there is provided the dividing device in a disc accommodation section in a disc changer according to the ninth aspect, wherein the rotation mechanism further includes a gear box that decreases the turning force of the motor, an arc plate that is driven by the gear box, and a relay plate that rotates based on the move of the arc plate. The first and the second operation plates slide simultaneously based on the rotation of the relay plate.

According to an eleventh aspect of the invention, there is provided a dividing device in a disc accommodation section in a disc changer, including: a disc accommodation section that can accommodate plural discs; a disc content reproducing section; a lifting mechanism that lifts up and moves down the disc accommodation section; and three levers that can be engaged with the disc accommodation section positioned by the lifting mechanism, wherein the dividing device divides the disc accommodation section by the lifting mechanism, after engaging the three levers with each other. According to a twelfth aspect of the invention, the three levers are engaged with the disc accommodation section by turning. According to a thirteenth aspect of the invention, the three levers are connected together by a spring. According to a fourteenth aspect of the invention, when the lifting mechanism moves down, the disc accommodation section is divided, and the center lever among the three levers supports the disc accommodation section corresponding to a disc of which content is to be reproduced.

According to the dividing device in the disc accommodation section in the disc changer according to the present invention, at the time of taking out a disc accommodated in the disc accommodation section, the disc of which content is to be reproduced and other discs can be separated in a simple structure.

BRIEF DESCRIPTION OF THE DRAWINGS

The present invention is illustrated by way of example and not limitation in the figure of the accompanying drawings in which like references indicate similar elements. Note that the following figures are not necessarily drawn to scale.

FIG. 2A to FIG. 2E are top plan views of the disc changer in a disc content reproduction operation;

FIG. 4A is a perspective view of a configuration of a dividing mechanism in a disc accommodation section according to one embodiment of the present invention;

FIG. 4B is a side view of the dividing mechanism shown in FIG. 4A in an assembled state;

FIG. 5A is a front view, a top plan view, and a side view respectively of a configuration of a dividing cam holder near one end in the disc accommodation section according to one embodiment;

FIG. 5B is a front view, a top plan view, and a side view respectively of a configuration of a dividing cam holder near the other end in the disc accommodation section according to the embodiment;

FIG. 5C is a side view of a key element of a disc changer showing an installation position of the dividing cam holder shown in FIG. 5A and FIG. 5B;

FIG. 7A and FIG. 7B are a top plan view of a key element and a side view of the key element respectively of the dividing mechanism before the rotation axis of the dividing mechanism rotates; and FIG. 7C and FIG. 7D are a top plan view of a key element and a side view of the key element respectively of the dividing mechanism after the rotation axis of the dividing mechanism rotates by 45 degrees;

FIG. 8A and FIG. 8B are a top plan view of a key element and a side view of the key element respectively of the dividing mechanism after the rotation axis of the dividing mechanism rotates by 90 degrees; and FIG. 8C and FIG. 8D are a top plan view of a key element and a side view of the key element respectively of the dividing mechanism when a base plate starts moving down in the state that the rotation axis of the dividing mechanism has rotated by 90 degrees;

FIG. 9A and FIG. 9B are a top plan view of a key element and a side view of the key element respectively of the dividing mechanism when the base plate moves down and a second lever is brought into contact with the dividing cam holder in the state that the rotation axis of the dividing mechanism has rotated by 90 degrees; and FIG. 9C and FIG. 9D are a top plan view of a key element and a side view of the key element respectively of the dividing mechanism when the base plate has further moved down and reached the lower end from the state shown in FIG. 9A and FIG. 9B;

FIG. 10A and FIG. 10B are a top plan view of a key element and a side view of the key element respectively of the dividing mechanism when the rotation axis of the dividing mechanism returns by 45 degrees from the position shown in FIG. 9C and FIG. 9D, and when the second lever has moved down along the slope of the dividing cam holder; and FIG. 10C and FIG. 10D are a top plan view of a key element and a side view of the key element respectively of the dividing mechanism when the rotation axis of the dividing mechanism has further rotated to 90 degrees from the state shown in FIG. 10A and FIG. 10B;

DESCRIPTION OF THE PREFERRED EMBODIMENTS

Disc changers according to embodiments of the present invention are explained in detail below with reference to the accompanying drawings.

Figure 1:
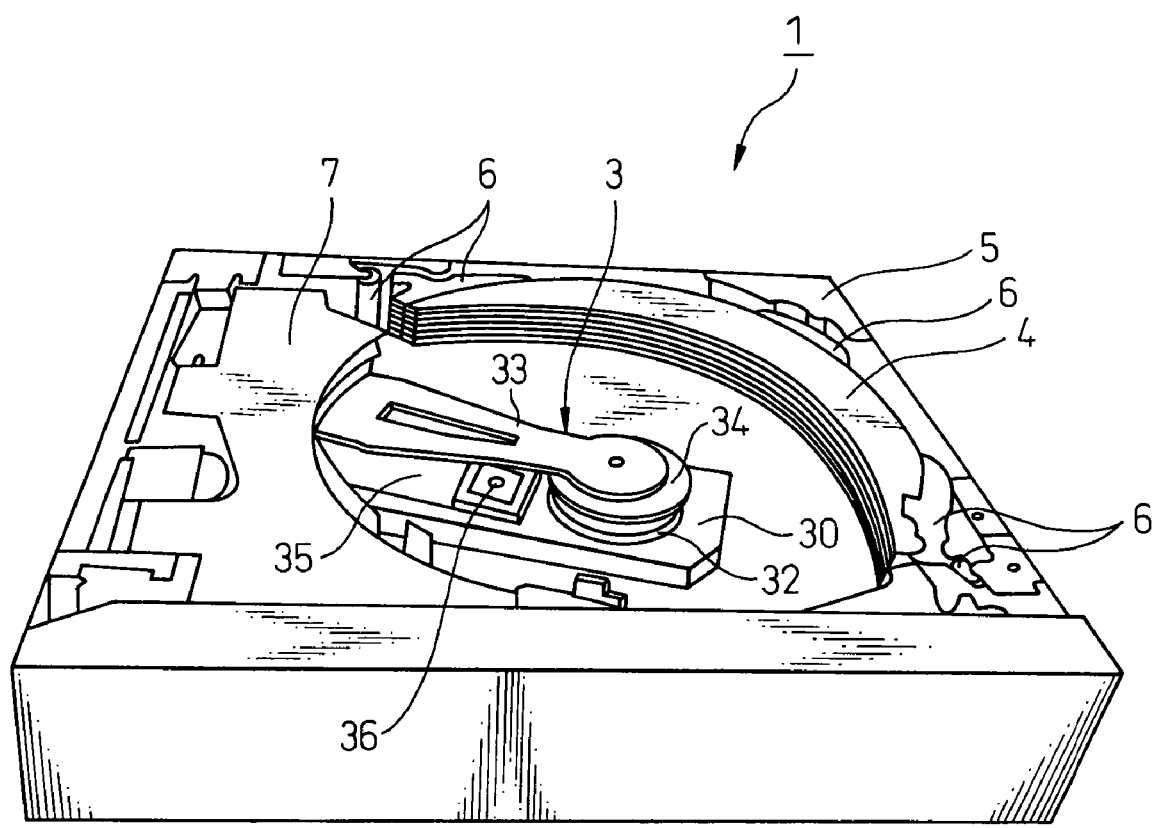
FIG. 1 is a perspective view of a configuration of a disc changer to which the present invention is applied.

FIG. 1 is a perspective view of a configuration of a disc changer 1 to which the present invention is applied, where a disc is not accommodated. The disc changer 1 to which the present invention is applied includes a stocker 4 as a disc accommodation section capable of accommodating plural discs and capable of being lifted up and moved down within the disc changer, a swing arm 3 that takes out a disc from the stocker 4, reproduces content of the disc, and returns the disc to the stocker 4 after the reproduction, a drive unit 7 of the swing arm 3, a linear position sensor (not shown) that detects a position of the stocker 4, and a lifting mechanism 5 that lifts up and moves down the stocker 4 based on an output of the linear position sensor.

The swing arm 3 is rotated by the drive unit 7, and broadly includes a frame 30 and a clamp arm 33. A turntable 32 on which a disc is rotated is provided at the front end of the frame 30. An optical head 36 and a moving path 35 on which the optical head 36 moves are provided at the center of the frame 30. A base of the clamp arm 33 is fitted to the upper part of the frame 30 with a rotation axis. A clamper 34 that clamps a disc is rotatably provided at the front end of the clamp arm 33. The front end of the clamp arm 33 rotates to the frame 30 side, and sandwiches and fixes a disc mounted onto the turntable 32 with the clamper 34.

A position of the swing arm 3 in a vertical direction within the disc changer 1 is unchanged, and is constant. Therefore, in order to enable the swing arm 3 to clamp a desired one of the discs accommodated in the stocker 4, the stocker 4 is divided in a vertical direction and moves within the disc changer 1. The stocker 4 has one stocker base, and plural movable stockers as movable racks mounted on the stocker base. Each movable stocker can accommodate one disc. The stocker 4 moves up and down within the disc changer 1 based on the operation of the stocker lifting mechanism 5. In order to enable the swing arm 3 to take out a desired one of discs held in the stocker 4, the movable stockers constituting the stocker 4 can be divided into up and down portions at a desired position by a stocker dividing mechanism 6.

The dividing mechanism 6 of the stocker is provided at three positions, i.e., at both ends of the stocker 4 and near the center of the stocker 4, and these dividing mechanisms are interlocked. The number of the stocker dividing mechanisms 6 can be changed according to needs. The stocker dividing mechanisms 6 of the present invention have characteristics in their structures, and the structures and operation are described later in detail.

Normal operation of the drive unit 7 of the swing arm and the stocker dividing mechanism 6 in the disc changer 1 to which the present invention is applied are explained below. In other words, the operation where the swing arm 3 takes out one disc from the stocker 4, reproduces the content of the disc, and returns the disc to the stocker 4 after the reproduction is explained with reference to FIG. 2A to FIG. 2E and FIG. 3A to FIG. 3L. FIG. 2A to FIG. 2E are top plan views the disc changer in operation, and FIG. 3A to FIG. 3L are side views of the disc changer in operation.

First, positions of the disc 2, the swing arm 3, and the stocker 4 in the disc changer 1 are explained with reference to FIG. 2A to FIG. 2E. FIG. 2A shows a waiting state of the disc changer 1 when the disc changer is not operating, or a state that the power supply to the disc changer 1 is disconnected. In this state, plural discs 2 are accommodated in the stocker 4. The swing arm 3 is accommodated in the swing arm drive unit 7, and is not shown in FIG. 2A. In this case, the discs within the stocker 4 can be freely lifted up and moved down with the stocker lifting mechanism 5 in the drive unit.

The operation of taking out the top disc 2 from among the discs accommodated in the stocker 4, and returning the disc to the stocker 4 after reproducing the content of the disc is explained with reference to FIG. 2B to FIG. 2E. In order to reproduce the content of the top disc 2 out of the discs 2 accommodated in the stocker 4, the stocker lifting mechanism 5 moves down the stocker 4 in the state shown in FIG. 2A. The top disc 2 is brought to a position at which this disc 2 is taken out with the swing arm 3. While the details are described later, the movable stockers in the stocker 4 are divided into upper and lower parts in this state. Only the movable stocker that accommodates the disc 2 of which content is to be reproduced is left, and other movable stockers in the stocker 4 fall further.

When the fall of the other movable stockers in the stocker 4 and the isolation of the movable stocker accommodating the reproduction disc 2 are completed, the swing arm drive unit 7 drives the swing arm to rotate the swing arm toward a center hole of the disc 2 within the disc changer, as shown in FIG. 2B. In FIG. 2B, only the clamp arm 33 located above the swing arm 3, and the clamper 34 are shown. Because the frame of the swing arm 3 is located below the disc 2, the frame is not shown in FIG. 2B. The not shown frame moves between the reproduction disc 2 and other discs 2 that are divided and located below this reproduction disc 2.

As shown in FIG. 2C, the swing arm 3 stops the rotation above the center hole of the disc 2. In this state, only the movable stocker 4 that accommodates the reproduction disc 2 falls, and disc held in this stocker is mounted on the turntable of the swing arm 3. When the reproduction disc 2 is mounted on the turntable, the clamp arm 33 of the swing arm 3 rotates to the turntable, and the clamper 34 clamps the reproduction disc 2 and fixes it onto the turntable.

When the clamper 34 fixes the reproduction disc 2 onto the turntable, the swing arm 3 rotates to a reproduction position of the disc 2, and reproduces the content of the disc 2, as shown in FIG. 2D. When the reproduction of the content of the disc 2 ends, the swing arm 3 rotates again toward the center hole of the disc 2 held in the movable stocker 4, and accommodates the disc 2 of which content has been reproduced into the stocker 4, as shown in FIG. 2E. FIG. 2E shows a state that a part of the disc 2 of which content has been reproduced is inserted into the stocker 4, and not a state that the disc 2 is completely returned to the stocker 4.

When the disc 2 of which content has been reproduced is completely accommodated in the stocker 4, the state as shown in FIG. 2C is obtained. Thereafter, the swing arm 3 rotates and returns to the drive unit 7 of the swing arm 3, and reaches the state as shown in FIG. 2A. In this state, the stocker 4 moves in an up or down direction to bring the next disc 2, of which the content is to be reproduced, to a position of the swing arm 3, and repeats the same reproduction of this disc 2. The disc 2 accommodated in the stocker 4 can be changed with other disc located at the outside of the disc changer, but the change of the disc 2 is not explained here.

Figure 3A:
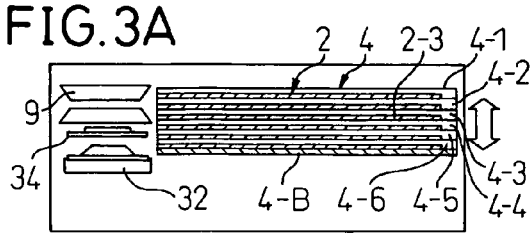
FIG. 3A to FIG. 3L are side views of the disc changer in the disc content reproduction operation.

The above operation of taking out the disc 2 from the stocker 4, reproducing the content of the disc 2, and returning the disc 2 to the stocker 4 as observed from the side surface of the disc changer 1 is explained in further detail with reference to FIG. 3A to FIG. 3L. In order to make clear the dividing operation of the stocker 4, a state of reproducing the content of a disc 2-3 located at a third position from the top of the discs 2 stored in the stocker 4 is explained. As shown in FIG. 3A, six movable stockers 4-1 to 4-6 are mounted on a stocker base 4-B of the stocker 4. Each of the movable stockers 4-1 to 4-6 can be moved independently. Each of the movable stockers 4-1 to 4-6 can accommodate one disc 2. The six discs 2 are identified as a disc 2-1 to a disc 2-6 from the top, as shown in FIG. 3B.

FIG. 3A shows the same state as that of FIG. 2A, and shows a state before the content of the disc 2 is reproduced. FIG. 3A shows only the turntable 32 and the clamper 34 of the swing arm 3, and omits the other constituent members of the swing arm 3. A reference symbol 9 denotes a disc guide member that guides the disc 2 at the time of inserting the disc 2 into or discharging the disc 2 from the disc changer. In a "disc selection" state shown in FIG. 3A, the turntable 32 and the clamper 34 are at a position sheltered from the moving range of the disc 2, and the disc 2 is movable by the stocker 4 in a vertical direction of the disc changer 1. In other words, FIG. 3A shows a state that the stocker 4 has moved to a position where the disc of which content is to be reproduced, for example, the disc 2-3 at the third position from the top of the discs 2, is selected.

Figure 3B:
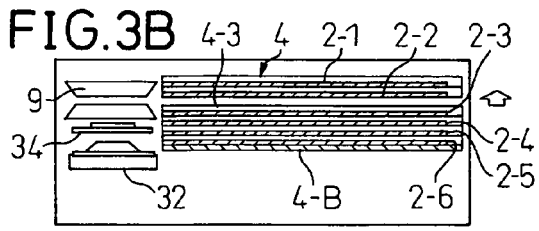

FIG. 3B shows an "upward division" state where the stocker dividing mechanism has separated stockers 4-1 and 4-2 from stockers 4-3 to 4-6 in order to select the disc 2-3 of which content is to be reproduced. In other words, FIG. 3B shows a state that only the stockers 4-1 and 4-2 are separated from the other stockers 4-3 to 4-6, and are lifted up.

Figure 3C:
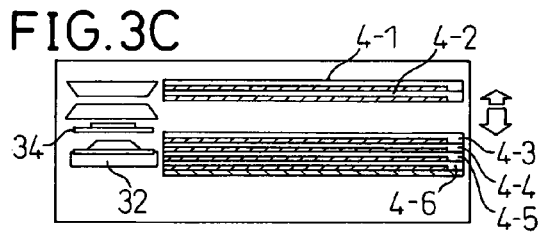
Figure 3D:
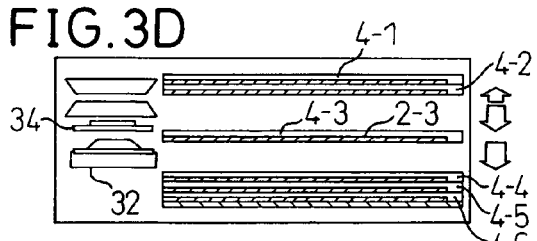

FIG. 3C shows a "large division in progress" state where the stocker dividing mechanism moves down only the stockers 4-3 to 4-6, while keeping the stockers 4-1 and 4-2 as they are, from the state shown in FIG. 3B. In the "large division" in progress state, only the movable stocker 4-3 at the third position from the top stops at a predetermined fall position, and the other stockers 4-4 to 4-6 continue to be moved down, and a "large division" state shown in FIG. 3D is obtained. In other words, FIG. 3D shows a state where the disc 2-3, of which content is to be reproduced and which is in the movable stocker 4-3 at the third position from the top, is selected, that is, the stocker 4 is divided into three parts. In this state, a space into which the turntable 32 can be inserted is formed below the selected disc 2-3, and a space into which the clamper 34 can be inserted is formed above the disc 2-3. The state shown in FIG. 3D is the same as the state shown in FIG. 2A. The dividing mechanism of the stocker 4 is described later.

Figure 3E:
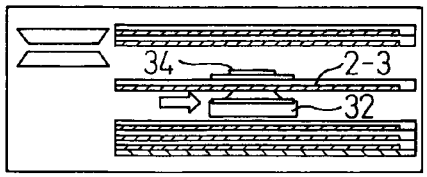
Figure 3F:
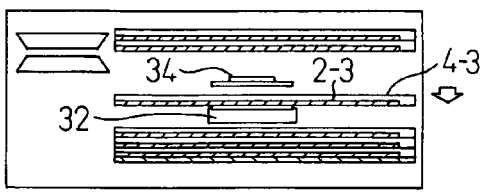

FIG. 3E shows a "drive insertion" state where, after the "large division" state shown in FIG. 3D, the turntable 32 and the clamper 34 that constitute a disc drive are inserted into the upper space and the lower space respectively. FIG. 3E corresponds to the state shown in FIG. 2B and FIG. 2C. The insertion of the turntable 32 and the clamper 34 ends at the position of the center hole of the disc 2-3. Thereafter, as shown in FIG. 3F, a "disc mounting" state is obtained where the third movable stocker 4-3 from the top falls, and the disc 2-3 held in the movable stocker 4-3 is mounted on the turntable 32.

Figure 3G:
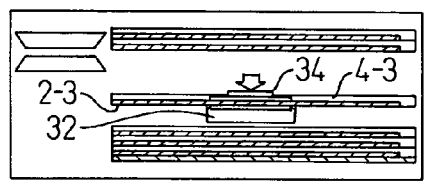
Figure 3H:
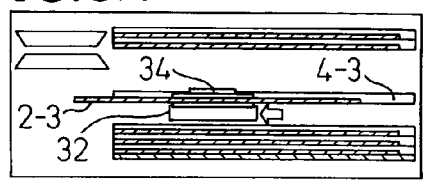
Figure 3I:
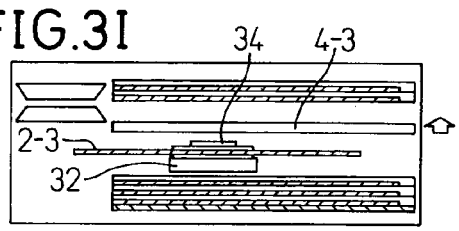

When the disc 2-3 is mounted on the turntable 32, a "clamping" state is obtained where the clamper 34 clamps the disc 2-3 as shown in FIG. 3G. Then, as shown in FIG. 3H, a "disc drawing" state is obtained where the disc 2-3 is extracted from the stocker 4-3 based on the move of the turntable 32. Because the stocker 4-3 is a crescent as shown in FIG. 1 and FIG. 2A to FIG. 2E, when the turntable 32 moves to the reproduction position to some extent, the turntable 32 is not engaged with the disc 2-3. In this state, the stocker 4-3 having no disc moves up to become in a "reproduction upward division" state as shown in FIG. 3I.

Figure 3J:
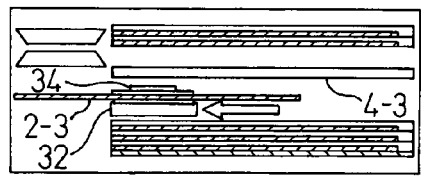
Figure 3K:
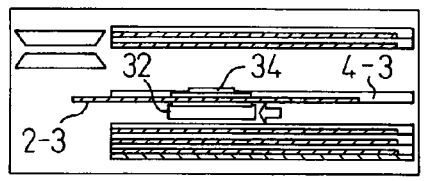

Thereafter, the turntable 32 further continues to rotate to a direction of extracting the disc 2-3, and stops at a "reproduction position" state as shown in FIG. 3J. This state corresponds to the state shown in FIG. 2D, and the content of the disc 2-3 is reproduced at this position. After the reproduction of the content, the turntable 32 moves to the stocker 4, and carries out a "disc accommodation" operation of accommodating the disc 2-3 in the original movable stocker 4-3, as shown in FIG. 3K. The state of FIG. 3K corresponds to the state shown in FIG. 2E. At this time, the movable stocker 4-3 is already down at the position of accommodating the disc 2-3.

Figure 3L:
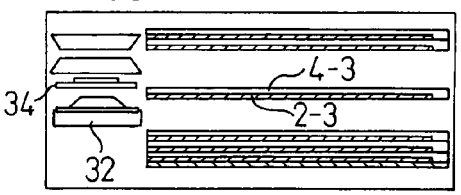

When the disc 2-3 is accommodated in the movable stocker 4-3, the clamper 34 rises, and the disc 2-3 becomes free on the turntable 32. Therefore, the turntable 32 and the clamper 34 constituting the disc drive carries out a "drive recession" to go back to a position where the turntable 32 and the clamper 34 do not interfere with the disc held on the stocker 4, thereby ending the reproduction of the content of the disc 2-3, as shown in FIG. 3L. Thereafter, the movable stocker 4-3 rises to the position as shown in FIG. 3C. When a reproduction of the content of the disc 2 is to be further continued, the dividing position of the stocker 4 shown in FIG. 3C changes to the position shown in FIG. 3A via the position shown in FIG. 3B. Then the dividing position of the stocker 4 changes based on the lifting mechanism, and the operation similar to that shown in FIG. 3B to FIG. 3L is repeated.

One example of the configuration of the stocker dividing mechanism 6 of the dividing device in the disc accommodation section according to the present invention is explained below with reference to FIG. 4A and FIG. 4B. The configuration of each of the stocker dividing mechanisms 6 is the same. FIG. 4A is a perspective view of the configuration of the dividing mechanism 6 according to one embodiment of the present invention. The stocker dividing mechanism 6 according to the embodiment includes a rotation axis 20, a first to a third levers 40, 50, and 60, and two tension springs 11 and 12.

The rotation axis 20 is rotatably and axially supported by the casing of the disc changer, and includes a cylindrical body 22 having a fitting hole 21, a key 23 provided in projection on the side surface of the cylindrical body 22 in the axial line direction, a flange 24 provided in a fan shape at a lower end of the cylindrical body 22, and a cam 25 provided in projection on the lower surface of the flange 24. In the present embodiment, the rotation axis 20 is provided at three positions, i.e., near both ends and near the center of the stocker 4 of the disc changer 1 shown in FIG. 1.

The first lever 40 is engaged with the upper end of the rotation axis 20, and includes a cylindrical body 42 having an upper base 41 at the center of which a fitting hole 41 is formed, a fan-shaped holding projection 44 provided on the side surface and the extension of the side surface of the cylindrical body 42, a fitting hook 45 of a tension spring, and a first rod 46 and a second rod 47. The holding projection 44 holds a part of the movable stocker by supporting this part from below. There are slits between the holding projections 44, by the number of discs that are accommodated in the disc changer.

A key groove not shown corresponding to the key 23 of the rotation axis 20 is formed inside a circular hole of the body 42 engaged with the rotation axis 20. Therefore, when the first lever 40 rotates, the rotation axis 20 rotates integrally with the first lever 40. The first lever 40 can be taken out from the rotation axis 20, and moves vertically together with the rotation axis 20. The first lever 40 is rotated based on force externally applied to the first rod 46 or the second rod 47. This rotation is described later.

The second lever 50 is fitted to the rotation axis 20 adjacently to the first lever 40, and includes a cylindrical body 52, two fan-shaped holding projections 54 provided on the side surface of the cylindrical body 52, a cam 55 provided in projection on the external surface of the cylindrical body 52, and a fitting hook 56 of a tension spring. The lower surface of the cam 55 is perpendicular to the cylindrical body 52. Two holding projections 54 sandwich and hold a part of a movable stocker. A key groove 53 corresponding to the key 23 of the rotation axis 20 is formed inside a circular hole 51 of the body 52 engaged with the rotation axis 20. Therefore, the second lever 50 does not rotate around the rotation axis 20 in a circular direction. The second lever 50 can slide along the rotation axis 20 in the axial line direction (i.e., a vertical direction).

The third lever 60 is fitted to the rotation axis 20 adjacently to the second lever 50, and includes a cylindrical body 62, a fan-shaped holding projection 64 provided on the side surface of the cylindrical body 62, and a fitting hook 56 of a tension spring. The holding projection 64 holds a part of a movable stocker by supporting this part from below. There are slits between the holding projections 64, by the number of discs that are accommodated in the disc changer. A key groove 63 corresponding to the key 23 of the rotation axis 20 is formed inside a circular hole 61 of the body 62 engaged with the rotation axis 20. Therefore, the third lever 60 does not rotate around the rotation axis 20 in a circular direction. The third lever 60 can slide along the rotation axis 20 in the axial line direction (i.e., a vertical direction).

FIG. 4B is a side view of the dividing mechanism 6 shown in FIG. 4A in an assembled state. The tension spring 11 is applied between the hook 45 of the first lever 40 and the hook 65 of the third lever 60. The tension spring 12 is applied between the hook 56 of the second lever 50 and a hook 66 of the third lever 60. Therefore, the hook 45 and the hook 65 are at the same position in a direction parallel with the axial line of the rotation axis 20, and the hook 56 and the hook 66 are also at the same position in a direction parallel with the axial line of the rotation axis 20.

In this configuration, the third lever 60 can move relative to the second lever 50 on the rotation axis 20, and the second lever 50 can move relative to the first lever 40 on the rotation axis 20. Among the holding projections 44 of the first lever 40, the holding projection 44 that is adjacent to the holding projections 54 of the second lever 50 has a small thickness. Among the holding projections 64 of the third lever 60, the holding projection 64 that is adjacent to the holding projections 54 of the second lever 50 has a small thickness. These small thicknesses are formed to make equal intervals of the holding projections.

FIG. 5A to FIG. 5C are configuration diagrams of a dividing cam holder 70 as a dividing member that constitutes the dividing device in the disc accommodation section of the disc changer. As shown in FIG. 5C, the dividing cam holder 70 is fixed to a casing 8 near the stocker dividing mechanism 6 of the disc drive unit. The shape of the dividing cam holder 70 is different depending on the position of the casing 8 where the dividing cam holder 70 is fitted. Basically, the dividing cam holder 70 includes a fitting section 71 that is fixed to the casing 8, and a guide wall 72 that forms a right angle with the fitting section 71.

An engagement section 73 and a slope 74 that continues to the engagement section 73 are formed on the upper surface of the guide wall 72. The engagement section 73 stops fall of the second lever 50 by being brought into contact with the lower surface of the cam 55 of the second lever 50 when the second lever 50 falls along the rotation axis 20. The slope 74 is engaged with the cam 55 of the second lever 50 when the rotation axis 20 rotates in the state that the cam 55 is latched by the engagement section 73. The slope 74 makes the cam 55 move up or move down between the engagement section 73 and a lower position.

Figure 6A:
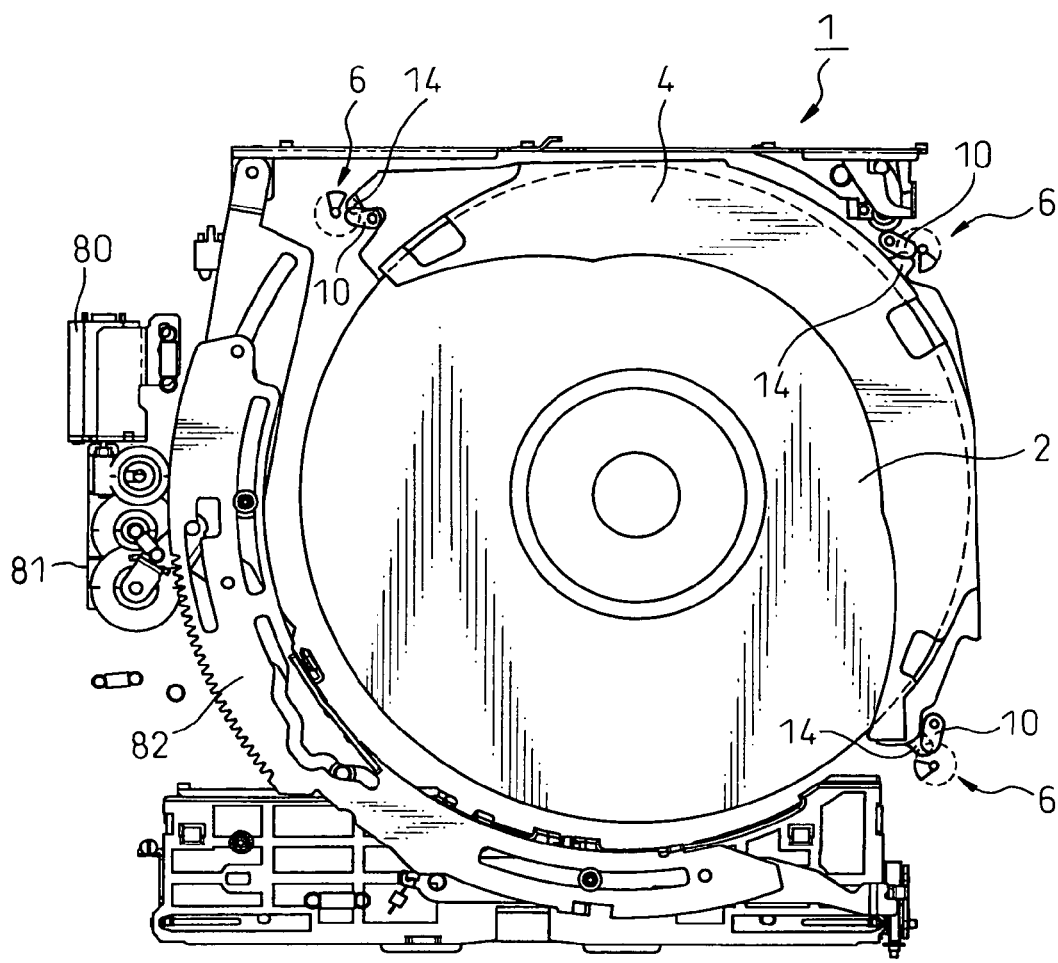
FIG. 6A is a top plan view of the disc changer showing an installation position of the dividing mechanism according to one embodiment of the present invention.
Figure 6B:
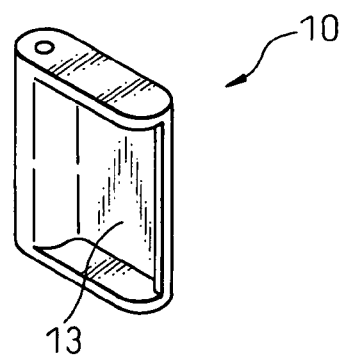
FIG. 6B is a perspective view of a configuration of a stocker holding lever provided adjacently to the dividing mechanism according to the embodiment of the present invention.

FIG. 6A is a top plan view of the disc changer 1 showing installation positions of the disc 2, the stocker 4, the stocker dividing mechanism 6, and the stocker holding lever 10 according to one embodiment of the present invention. FIG. 6B is a perspective view of a configuration of the stocker holding lever 10 shown in FIG. 6A. The stocker holding lever 10 is rotatably and axially supported on the stocker base that constitutes the stocker 4. A recess 13 that accommodates a claw-shaped latch projection 14 provided in each movable stocker of the stocker 4 facing the stocker dividing mechanism 6 is formed in the stocker holding lever 10. The recess 13 has a height at which the whole latch projections 14 of the movable stockers laminated on the stocker base can be accommodated.

As shown in FIG. 6A, when the stocker dividing mechanism 6 is not engaged with the latch projection 14 of the movable stocker 4, the engagement projection 14 of each movable stocker 4 is accommodated in the recess 13 of the stocker holding lever 10, thereby preventing the stocker 4 from being dispersed. The shape of the stocker holding lever 10 is not limited to the shape of this example, and can hold the whole latch projections 14 of the stocker 4. While a motor 80 that rotates the stocker dividing mechanism 6, a gear box 81, and an arc plate 82 are shown in FIG. 6A, operations of these units are described later.

Operations of the stocker dividing mechanism 6 and the stocker holding lever 10 according to the embodiment of the present invention are explained below with reference to FIG. 7A to FIG. 10D. In the following explanation, shapes of the first to the fourth levers 40, 50, and 60, and shapes of the holding projections 44, 54, and 64 that are formed in projection on these levers are simplified. Engagement between a holding projection and a divided stocker is made clear. The holding projections 44, 54, and 64 when the rotation axis 20 of the stocker dividing mechanism 6 has rotated by 45 degrees are shown as outline shapes, and the holding projections 44, 54, and 64 when the rotation axis 20 has rotated by 90 degrees are shown as thick lines. Because the stocker base 4-B is engaged with the holding projection 64 of the third lever 60, the third lever 60 is lifted up and moved down based on the rise and fall of the stocker base 4-B.

Figure 7A:
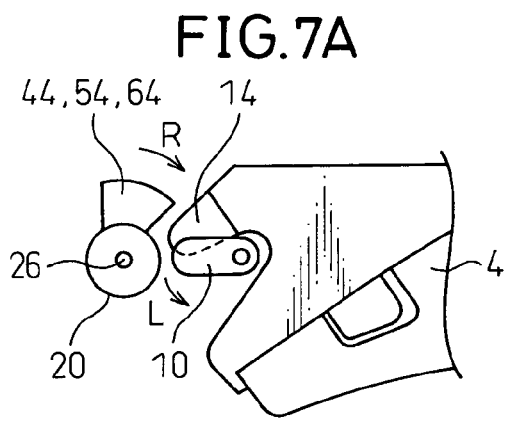
FIG. 7A to FIG. 7D show operation of the dividing device according to the present invention.
Figure 7B:
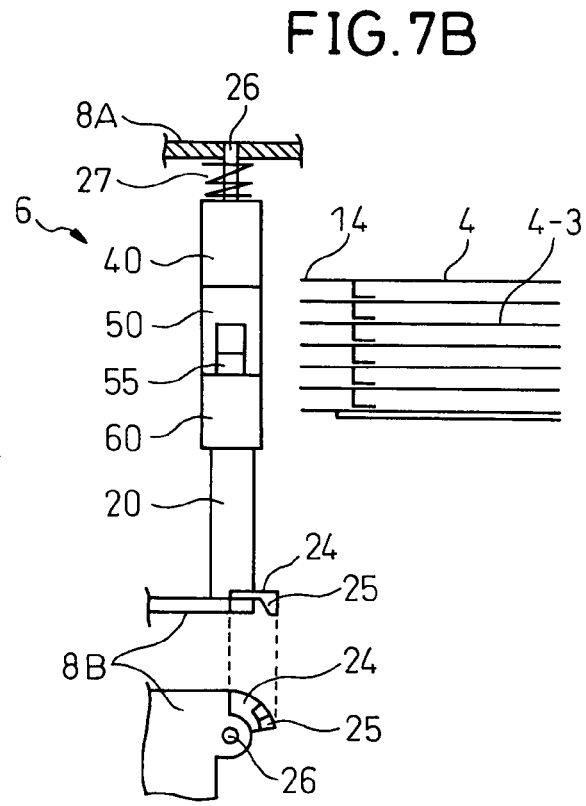

FIG. 7A and FIG. 7B show a state before the rotation axis 20 of the dividing mechanism 6 rotates. The whole latch projections 14 of the stocker 4 are latched by the stocker holding lever 10 shown in FIG. 6A and FIG. 6B. In this state, the stocker 4 can be freely lifted up and moved down in the upper limit direction of the disc changer. Therefore, in this state, the stocker 4 accommodating the disc of which content is to be reproduced can be moved to the position facing the holding mechanism 54 of the second lever 50 of the dividing mechanism 6.

An example of the case where the stocker 4-3 that accommodates the disc at the third position from the top has moved to the position facing the holding projection 54 of the second lever 50 is explained, like the example explained with reference to FIG. 3A to FIG. 3L. The rotation axis 20 is axially supported by a ceiling plate 8A and a bottom plate 8B of the casing based on the fitting axis 26, and a compression spring 27 is set around the fitting axis 26 between the first lever 40 and the ceiling plate 8A. Therefore, the lower end of the rotation axis 20 is pressed against the bottom plate 8B side of the casing. The bottom plate 8B at the lower part of the rotation axis 20 is cut around the flange 24 of the rotation axis 20. Therefore, in this state, the cam 25 provided on the flange 24 is not on the bottom plate 8B.

Figure 7C:
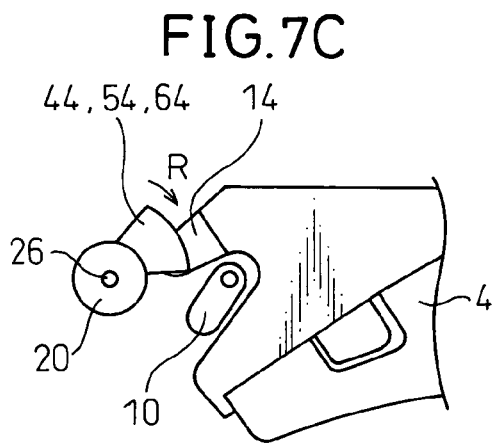
Figure 7D:
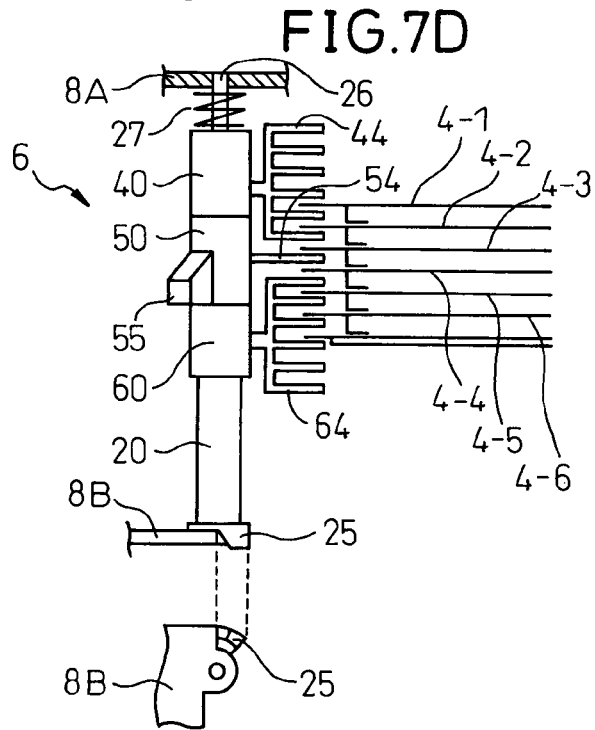

FIG. 7C and FIG. 7D show a state that the rotation axis 20 has rotated by 45 degrees to the direction of an arrowhead R from the state shown in FIG. 7A and FIG. 7B. In this state, the stocker holding lever 10 shown in FIG. 6A and FIG. 6B rotates to the direction of an arrowhead L, and the latch of the whole latch projections 14 in the stocker 4 are released. In this state, the movable stockers 4-1 and 4-2 of the stocker 4 are supported by the holding projection 44 of the first lever 40, the movable stocker 4-3 is supported by the holding projection 54 of the second lever 50, and the movable stockers 4-4 to 4-6 are supported by the holding projection 64 of the third lever 60. In this state, the cam 25 provided on the flange 24 is not on the bottom plate 8B. The state shown in FIG. 7A to FIG. 7D corresponds to the state shown in FIG. 3A.

Figure 8A:
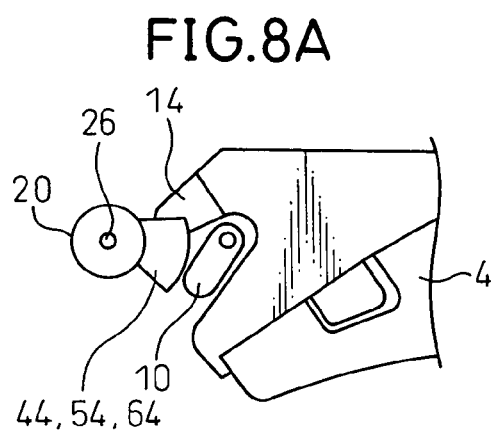
FIG. 8A to FIG. 8D show operation of the dividing device according to the present invention.
Figure 8B:
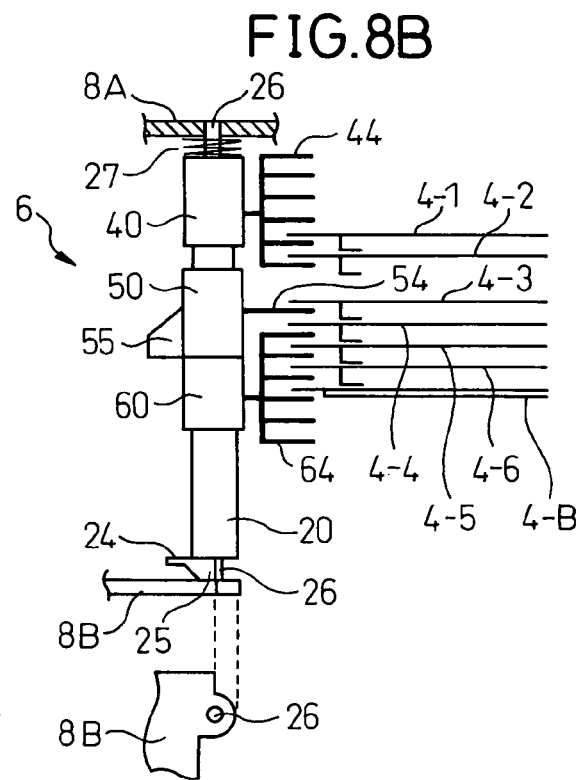

FIG. 8A and FIG. 8B show a state that the rotation axis 20 has further rotated by 45 degrees to the direction of the arrowhead R from the state shown in FIG. 7C and FIG. 7D. In other words, FIG. 8A and FIG. 8B show the state that the rotation axis 20 has rotated by 90 degrees from the initial state. The movable stockers 4-1 and 4-2 are supported by the holding projection 44 of the first lever 40, the movable stocker 4-3 is supported by the holding projection 54 of the second lever 50, and the movable stockers 4-4 to 4-6 are supported by the holding projection 64 of the third lever 60, like in the above state. On the other hand, in this state, the cam 25 provided on the flange 24 is mounted on the bottom plate 8B. As a result, the rotation axis 20 moves upward by the height of the cam 25. Because the first lever 40 moves together with the rotation axis 20, the first lever 40 moves to the ceiling plate 8A side of the casing, thereby compressing the compression spring 27. In this state, only the movable stockers 4-1 and 4-2 are supported by the holding projection 44 of the first lever 40, and are lifted up along the rise of the first lever 40. The state shown in FIG. 8A and FIG. 8B corresponds to the state shown in FIG. 3B.

Figure 8C:
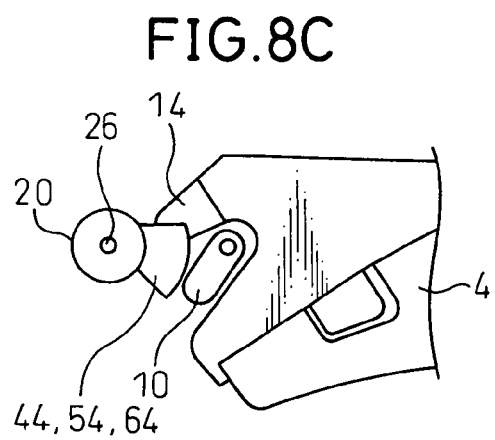
Figure 8D:
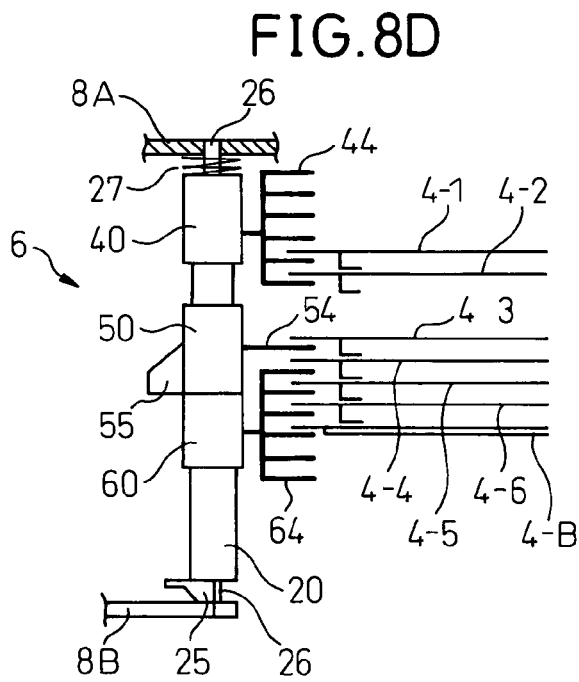

FIG. 8C and FIG. 8D show a state that the stocker base 4-B starts moving down from the state shown in FIG. 8A and FIG. 8B. When the stocker base 4-B moves down, the movable stockers 4-3 to 4-6 move down, while the positions of the movable stockers 4-1 and 4-2 supported by the holding projection 44 of the first lever 40 remain unchanged. The second lever 50 and the third lever 60 that hold the movable stockers 4-3 to 4-6 fall together. The state shown in FIG. 8C and FIG. 8D corresponds to the state shown in FIG. 3C.

Figure 9A:
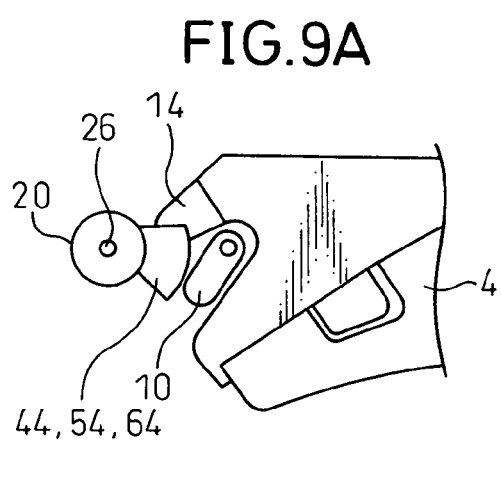
FIG. 9A to FIG. 9D show operation of the dividing device according to the present invention.
Figure 9B:
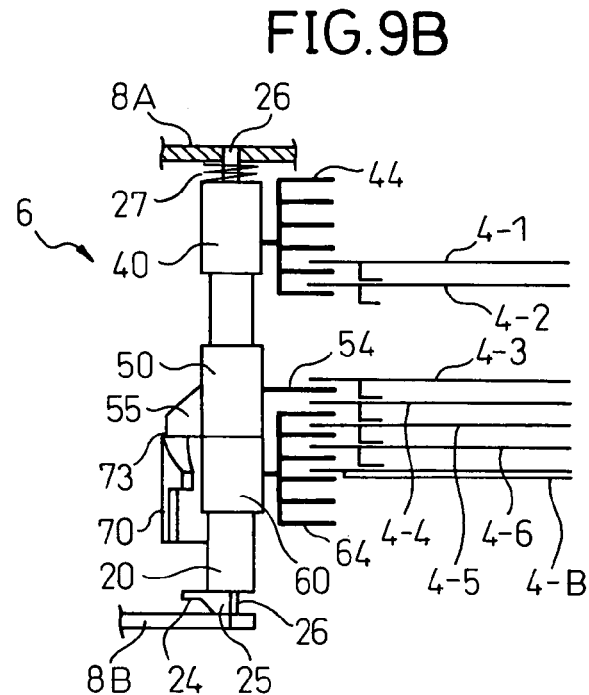

FIG. 9A and FIG. 9B show a state that the stocker base 4-B has further moved down from the state shown in FIG. 8C and FIG. 8D. As a result, the bottom surface of the cam 55 provided on the second lever 50 is brought into contact with the engagement section 73 of the dividing cam holder 70. When the cam 55 of the second lever 50 is brought into contact with the dividing cam holder 70, the movable stocker 4-3 stops moving down. Thereafter, only the movable stockers 4-4 to 4-6 move down based on the fall of the stocker base 4-B.

Figure 9C:
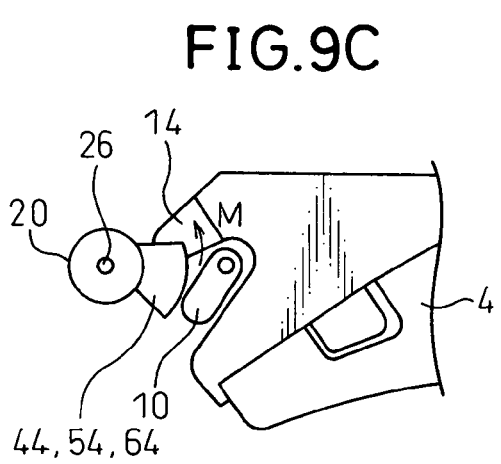
Figure 9D:
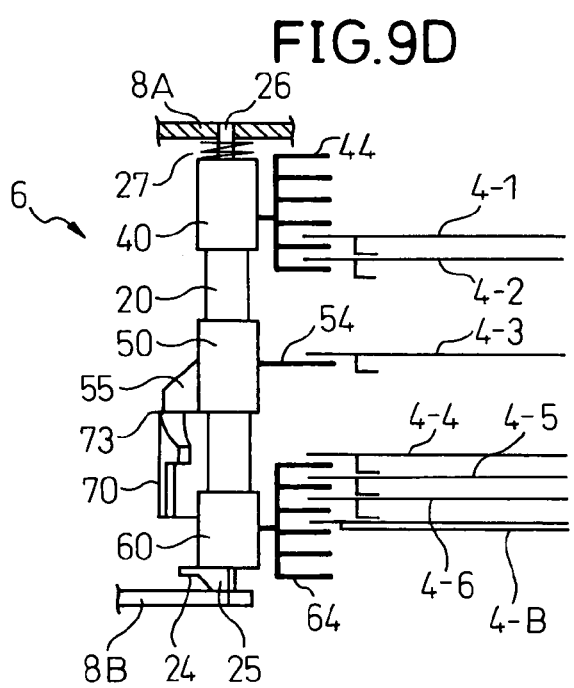

FIG. 9C and FIG. 9D show a state that the stocker base 4-B has further moved down from the state shown in FIG. 9A and FIG. 9B. As a result, the third lever 60 is finally brought into contact with the flange 24 of the rotation axis 20. The third lever 60 is not moved down any more. When the third lever 60 is brought into contact with the flange 24, the movable stockers 4-4 to 4-6 stop moving down. The state shown in FIG. 9C and FIG. 9D corresponds to the state shown in FIG. 3D. In the state shown in FIG. 9C and FIG. 9D, the turntable 32 is inserted into the space below the movable stocker 4-3, and the clamper 34 is inserted into the space above the movable stocker 4-3.

Figure 10A:
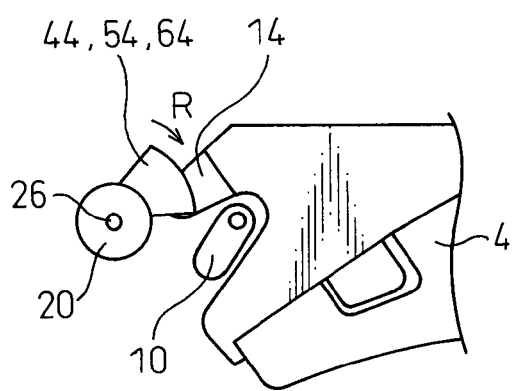
FIG. 10A to FIG. 10D show operation of the dividing device according to the present invention.
Figure 10B:
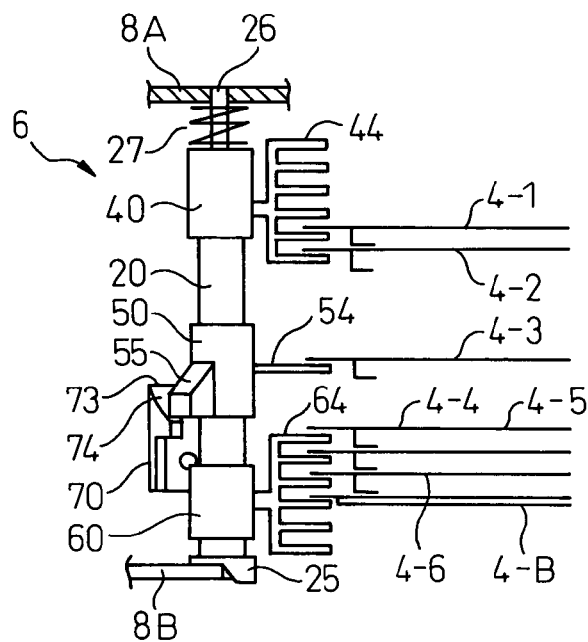
Figure 10C:
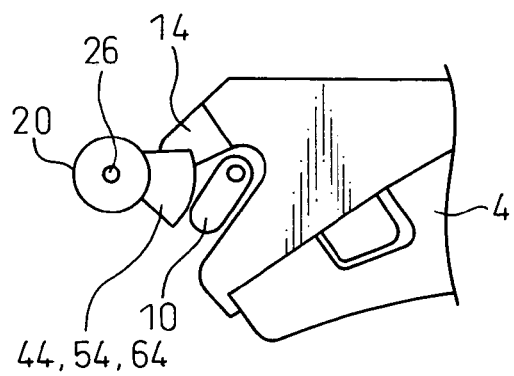
Figure 10D:
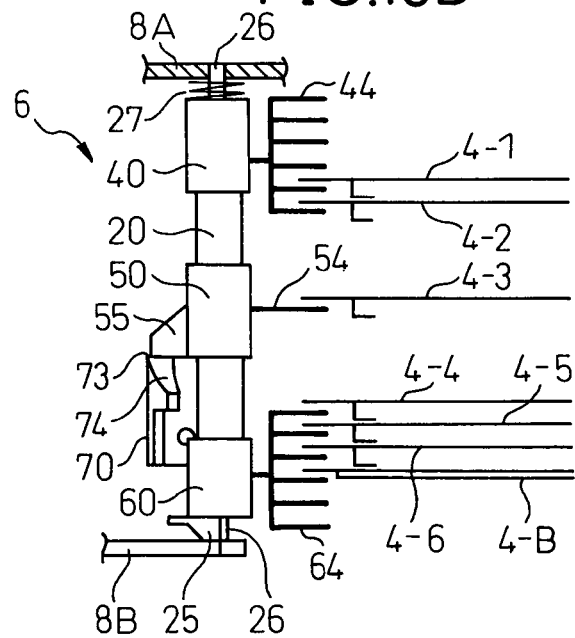

FIG. 10A and FIG. 10B show a state that, after the turntable 32 is inserted into the space below the movable stocker 4-3 and the clamper 34 is inserted into the space above the movable stocker 4-3, the rotation axis 20 is inversely rotated to the direction of an arrowhead M by 45 degrees in the state shown in FIG. 9C and FIG. 9D. When the rotation axis 20 rotates to the direction of the arrowhead M, the bottom surface of the cam 55 provided in projection on the second lever 50 falls along the slope 74 of the dividing cam holder 70. This is because the second lever 50 is pressed against the third lever 60 side by the tension spring 12, as shown in FIG. 4A and FIG. 4B.

Then, the movable stocker 4-3 held in the holding projection 54 of the second lever 50 is moved down and a disc, not shown, accommodated in the movable stocker 4-3 is mounted on the turntable 32. When the rotation axis 20 rotates to the direction of the arrowhead M, the cam 25 of the rotation axis 20 mounted on the bottom plate 8B of the casing is dismounted from the bottom plate 8B, and the rotation axis 20 also moves to the bottom plate 8B side of the casing by the height of the cam 25. As a result, the first lever 40 is moved down together with the rotation axis 20, and the position of the third lever 60 remains unchanged because the base stocker 4-B does not fall. The state shown in FIG. 10A and FIG. 10B corresponds to the state shown in FIG. 3F.

Thereafter, when the disc not shown accommodated in the movable stocker 4-3 is clamped by the turntable, extracted, and moved to the position where the disc does not interrupt the rise or fall of the stocker 4, the rotation axis 20 is rotated again to the direction of the arrowhead R by 45 degrees from the state shown in FIG. 10A and FIG. 10B. In other words, the rotation axis 20 is rotated by 90 degrees from the initial state. As a result, the cam 55 of the second lever 50 is lifted up along the slop 74 of the dividing cam holder 70, and the cam 25 provided on the flange 24 is mounted on the bottom plate 8B again. Consequently, the rotation axis 20 moves upward by the height of the cam 25. The state shown in FIG. 10C and FIG. 10D corresponds to the state shown in FIG. 3I.

Figure 11A:
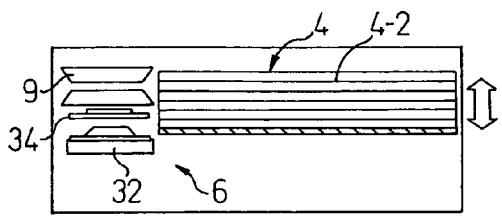
FIG. 11A to FIG. 11J are side views of the disc changer showing a disc insertion operation.
Figure 11G:
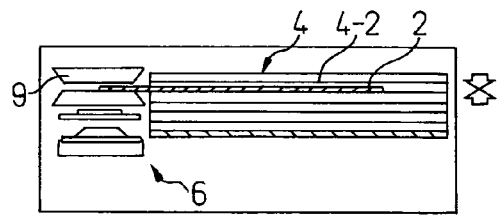
Figure 11B:
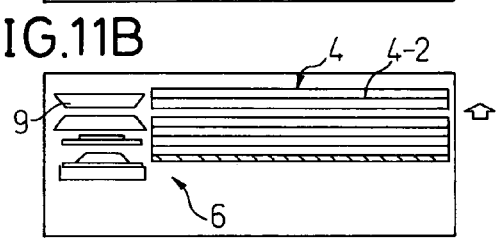
Figure 11H:
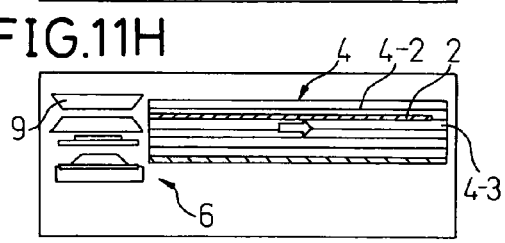

FIG. 11A to FIG. 11J show the insertion of the disc 2 into the stocker 4 of the disc changer 1. FIG. 11A shows a "stocker selection" state. The stocker dividing mechanism 6 is in the same state as that shown in FIG. 7A and FIG. 7B or FIG. 7C and FIG. 7D. The reference symbol 9 denotes the disc guide member, 32 denotes the turntable, and 34 denotes the clamper. In the subsequent explanation, members irrelevant to the disc insertion operation have no reference symbols. FIG. 11B shows the "upward division" state where the stocker 4 into which the disc 2 is inserted is determined to be the stocker 4-2 that is the second stocker from the top. The stocker dividing mechanism 6 is in the same state as that shown in FIG. 8A and FIG. 8B.

Figure 11C:
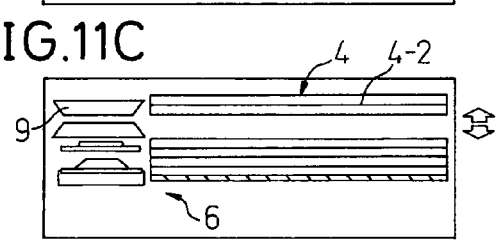

FIG. 11C shows a "small division" state, and the stocker dividing mechanism 6 is in the same state as that shown in FIG. 8C and FIG. 8D. In inserting the disc 2 into the disc changer, the stocker 4 does not need to be moved down until when the cam 55 of the second lever 50 shown in FIG. 9B and FIG. 9D is brought into contact with the dividing cam holder 70. Therefore, the stocker dividing mechanism 6 is in the same state as that shown in FIG. 8C and FIG. 8D up to a "disc insertion" state shown in FIG. 11D and an "insertion completion" state shown in FIG. 11E. At the time of inserting the disc 2 into the disc changer, the guide member 9 adjacent to the stocker 4 is opened, and a not-shown disc insertion/discharge mechanism having a discharge roller carries the disc.

Figure 11I:
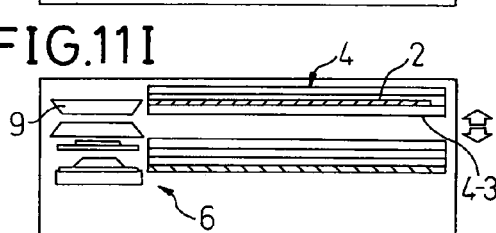
Figure 11D:
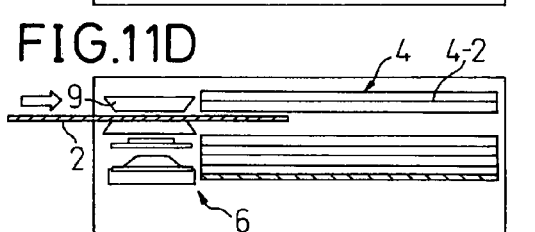
Figure 11J:
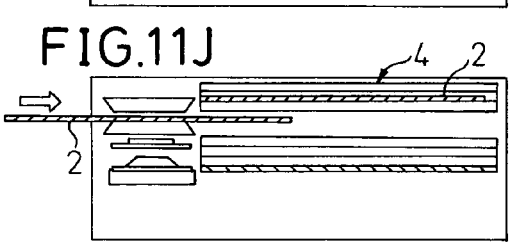
Figure 11E:
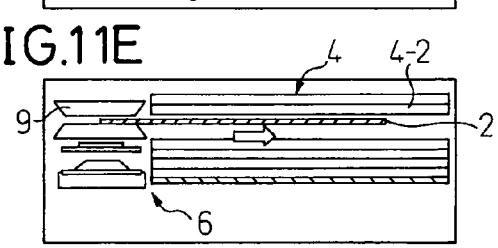
Figure 11F:
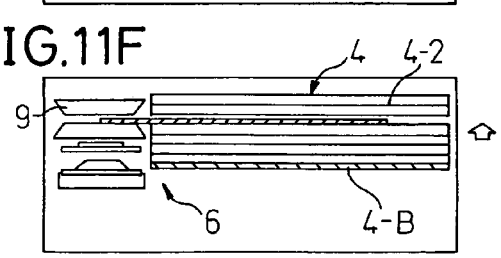

When the disc insertion is completed, the disc changer becomes in a "small division cancellation" state, as shown in FIG. 11F, and the stocker base 4-B is lifted up by the stocker dividing mechanism 6. The stocker dividing mechanism 6 is in the same state as that shown in FIG. 8A and FIG. 8B. Thereafter, the stocker base 4-B is lifted up, and the movable stocker held by the first lever lifted up by the rotation of the rotation axis is moved down. As a result, the disc changer becomes in an "upward division cancellation" state shown in FIG. 11G. The stocker dividing mechanism 6 in this state is in the same as that shown in FIG. 7C and FIG. 7D.

In the subsequent "disc pushing" state, a disc pushing mechanism not shown pushes the disc into the stocker 4. FIG. 11I and FIG. 11J show the "small division" state and the "disc insertion" state respectively where the stocker 4 into which the disc 2 is inserted has been determined to be the stocker 4-3 which is the third stocker from the top. Thereafter, the above disc insertion operation is repeated. In the above disc insertion operation, the dividing mechanism in the disc accommodation section according to the present invention operates efficiently.

Figure 12A:
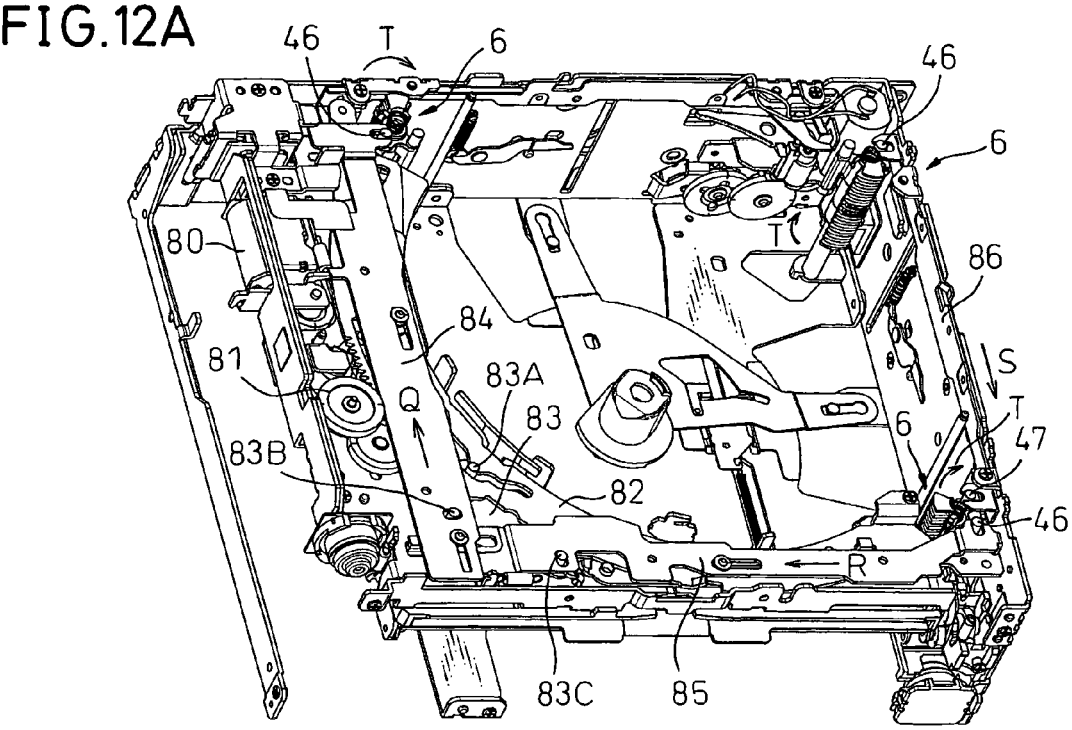
FIG. 12A is a perspective view of an operation mechanism including three operation plates that interlocks the stocker dividing mechanism.
Figure 12B:
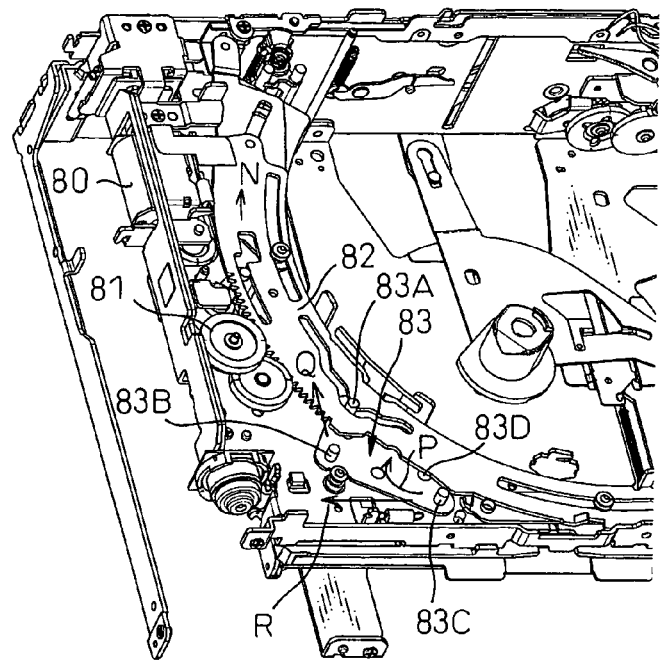
FIG. 12B is a partial perspective view of the operation mechanism shown in FIG. 12A in the state that the operation plates are removed.

One example of the mechanism of interlocking the stocker dividing mechanism 6 according to the present invention is explained below. FIG. 12A and FIG. 12B show the operation mechanism that interlocks the stocker dividing mechanism 6. As shown in FIG. 12B, the motor 80 as a driving source is fitted to the key part of the casing of the disc changer. A gearbox 81 that includes a combination of many gears is connected to the motor 80. The gearbox 81 decreases the turning force of the motor 80, and the decreased turning force is transmitted to an arc plate 82. The arc plate 82 has a shape not interrupting a vertical move of a disc not shown within the disc changer.

A relay plate 83 rotatably fitted to the bottom surface by a rotation axis 83D is provided between the bottom surface of the disc changer casing and the arc plate 82. The relay plate 83 is provided with a first pin 83A, a second pin 83B, and a third pin 83C. The relay plate 83 is engaged with the arc plate 82 using the first pin 83A. When the arc plate 82 moves, the relay plate 83 rotates.

As shown in FIG. 12A, the relay plate 83 is engaged with the first operation plate 84 via the second pin 83B, and is engaged with the second operation plate 85 via the third pin 83C. The first operation plate 84 is connected to the first rod 46 shown in FIG. 4A of the stocker dividing mechanism 6 via an engagement groove formed at a free end of the first operation plate 84. The second operation plate 85 is connected to the first rod 46 of the dividing mechanism 6 of a separate stocker, via an engagement groove formed at a free end of the second operation plate 85.

A third operation plate 86 of which both ends are engaged with the stocker dividing mechanism 6 is fitted to a chassis of the disc changer at a position facing the first operation plate 84 by sandwiching the disc accommodation space. One end of the third operation plate 86 is engaged with the second rod 47 of the dividing mechanism 6 of the stocker connected to the second operation plate 85, and the other end of the third operation plate 86 is engaged with the first rod 47 of the dividing mechanism 6 of a separate stocker.

If the arc plate 82 is rotated to the direction of an arrowhead N based on the rotation of the motor 80 then, as shown in FIG. 12B, the relay plate 83 is rotated to the direction of an arrowhead P. As a result, the second pin 83B moves to the direction of an arrowhead Q, and the third pin 83C moves to the direction of the arrowhead R. Then, the first operation plate 84 moves to the direction of the arrowhead Q. Consequently, the stocker dividing mechanism 6 engaged with the first operation plate 84 rotates to the direction of an arrowhead T. Because the second operation plate 85 moves to the direction of the arrowhead R, the stocker dividing mechanism 6 engaged with the second operation plate 85 rotates to the direction of the arrowhead T.

When the stocker dividing mechanism 6 rotates to the direction of the arrowhead T, the third operation plate 86 of which one end is engaged with the second rod 47 of the stocker dividing mechanism 6 moves to the direction of an arrowhead S. When the third operation plate 86 moves to the direction of the arrowhead S, the stocker dividing mechanism 6 which is engaged with the other end of the third operation plate 86 rotates to the direction of the arrowhead T. As explained above, according to the present embodiment, all stocker dividing mechanisms 6 rotate to the direction of the arrowhead T, i.e., the clockwise direction, based on the rotation of the motor 80. This operation is the one carried out by the stocker dividing mechanism 6 to latch the latch projection 14 of the stocker 4, as explained with reference to FIG. 6A. All the stocker dividing mechanisms 6 can carry out the same operation by being interlocked with each other.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A dividing device in a disc accommodation section in a disc changer, the disc changer having a plurality of movable racks, each being able to hold one disc and mounted on a base plate, a lifting mechanism for the base plate, and a reproducing device that reproduces content of a desired disc by taking the disc from the disc accommodation section, wherein the dividing device divides the disc accommodation section in upper and lower directions at a time of taking out the disc, comprising:
   a rotation axis axially supported at least at two positions close to the disc accommodation section, and rotatable by a predetermined angle by a rotation mechanism;
   a first lever fitted to an upper part of the rotation axis, and latchable to one of the plurality of movable racks based on the rotation of the rotation axis by a first angle;
   a second lever movably fitted to the rotation axis adjacent to the first lever, in an axial direction, and latches the one of the plurality of movable racks based on the rotation of the rotation axis by the first angle;
   a third lever movably fitted to the rotation axis adjacent to the second lever, in an axial direction, and latches the movable rack based on the rotation of the rotation axis by the first angle;
   an engagement member fixed to a casing of the disc changer near the rotation axis, and engaged with the second lever when the base plate moves down to a predetermined or lower height in a state that the rotation axis rotates by a second angle larger than the first angle to support the second lever; and
   a dividing member having a slope for lifting up and moving down the second lever by a predetermined height, when the rotation axis rotates in said state between the second angle and the first angle.

2. The dividing device in a disc accommodation section in a disc changer according to claim 1, wherein
   the rotation axis and the first, the second, and the third levers are connectable together by a key and a key groove.

3. The dividing device in a disc accommodation section in a disc changer according to claim 2, further comprising a cam provided at a lower end of the rotation axis so that the rotation axis is moved in the upper direction when the cam rotates by the second angle.

4. The dividing device in a disc accommodation section in a disc changer according to claim 1, further comprising a first tension spring between the first lever and the third lever, and a second tension lever between the second lever and the third lever.

5. The dividing device in a disc accommodation section in a disc changer according to claim 1, further comprising a claw-shaped latch section provided in the first lever and the third lever respectively, and a latch projection provided at a part of each movable rack facing the rotation axis, wherein a front end of the latch section is tapered to facilitate the insertion of the front of the latch section between the latch projections or into a space between the latch projection and the base plate, when the rotation axis rotates by the first angle.

6. The dividing device in a disc accommodation section in a disc changer according to claim 5, further comprising a holding lever on the base plate that prevents the plurality of movable racks from being separated when the latch sections of the first, the second, and the third levers are not engaged with the latch projections.

7. The dividing device in a disc accommodation section in a disc changer according to claim 1, wherein
   the dividing device is provided at at least two positions near an external periphery in the disc accommodation section, and wherein the dividing devices are operated simultaneously by the rotation mechanism.

8. The dividing device in a disc accommodation section in a disc changer according to claim 7, further comprising two rods provided at separated positions on a concentric circle in the first lever relative to the rotation axis, and the first lever is rotated when one of the rods is rotated by the rotation mechanism.

9. The dividing device in a disc accommodation section in a disc changer according to claim 8, wherein
   the dividing device includes a first, a second, and a third dividing devices that are provided at three positions near both ends and near the center in the disc accommodation section respectively, and
   the rotation mechanism comprises: a motor; a first operation plate of which a front end is engaged with one of the rods of the first dividing device, wherein the first operation plate slides based on a rotation of the motor to rotate the first dividing member; a second operation plate of which a front end is engaged with one of the rods of the second dividing device, wherein the second operation plate slides based on the rotation of the motor to rotate the second dividing member; and a third operation plate which is engaged with any one of the rods of the first and the second dividing devices and with any one of the rods of the third dividing device, and operates the third dividing device synchronously with the operation of other dividing devices.

10. The dividing device in a disc accommodation section in a disc changer according to claim 9, wherein
    the rotation mechanism further comprises a gear box that decreases a turning force of the motor, an arc plate that is driven by the gear box, and a relay plate that rotates based on a movement of the arc plate, and wherein
    the first and the second operation plates slide simultaneously based on a rotation of the relay plate.

11. The dividing device in a disc accommodation section in a disc changer according to claim 3, further comprising a first tension spring between the first lever and the third lever, and a second tension lever between the second lever and the third lever.

12. The dividing device in a disc accommodation section in a disc changer according to claim 11, further comprising a claw-shaped latch section provided in the first lever and the third lever respectively, and a latch projection provided at a part of each movable rack facing the rotation axis, wherein a front end of the latch section is tapered to facilitate the insertion of the front of the latch section between the latch projections or into a space between the latch projection and the base plate, when the rotation axis rotates by the first angle.

13. The dividing device in a disc accommodation section in a disc changer according to claim 12, further comprising a holding lever on the base plate that prevents the plurality of movable racks from being separated when the latch sections of the first, the second, and the third levers are not engaged with the latch projections.

14. The dividing device in a disc accommodation section in a disc changer according to claim 13, wherein
    the dividing device is provided at at least two positions near an external periphery in the disc accommodation section, and wherein the dividing devices are operated simultaneously by the rotation mechanism.

15. The dividing device in a disc accommodation section in a disc changer according to claim 14, further comprising two rods provided at separated positions on a concentric circle in the first lever relative to the rotation axis, and the first lever is rotated when one of the rods is rotated by the rotation mechanism.

16. The dividing device in a disc accommodation section in a disc changer according to claim 15, wherein
    the dividing device includes a first, a second, and a third dividing devices that are provided at three positions near both ends and near the center in the disc accommodation section respectively, and
    the rotation mechanism comprises: a motor; a first operation plate of which a front end is engaged with one of the rods of the first dividing device, wherein the first operation plate slides based on a rotation of the motor to rotate the first dividing member; a second operation plate of which a front end is engaged with one of the rods of the second dividing device, wherein the second operation plate slides based on the rotation of the motor to rotate the second dividing member; and a third operation plate which is engaged with any one of the rods of the first and the second dividing devices and with any one of the rods of the third dividing device, and operates the third dividing device synchronously with the operation of other dividing devices.

17. The dividing device in a disc accommodation section in a disc changer according to claim 16, wherein
    the rotation mechanism further comprises a gear box that decreases a turning force of the motor, an arc plate that is driven by the gear box, and a relay plate that rotates based on a movement of the arc plate, and wherein
    the first and the second operation plates slide simultaneously based on a rotation of the relay plate.

* * * * *